United States Patent Office 3,126,765
Patented Mar. 31, 1964

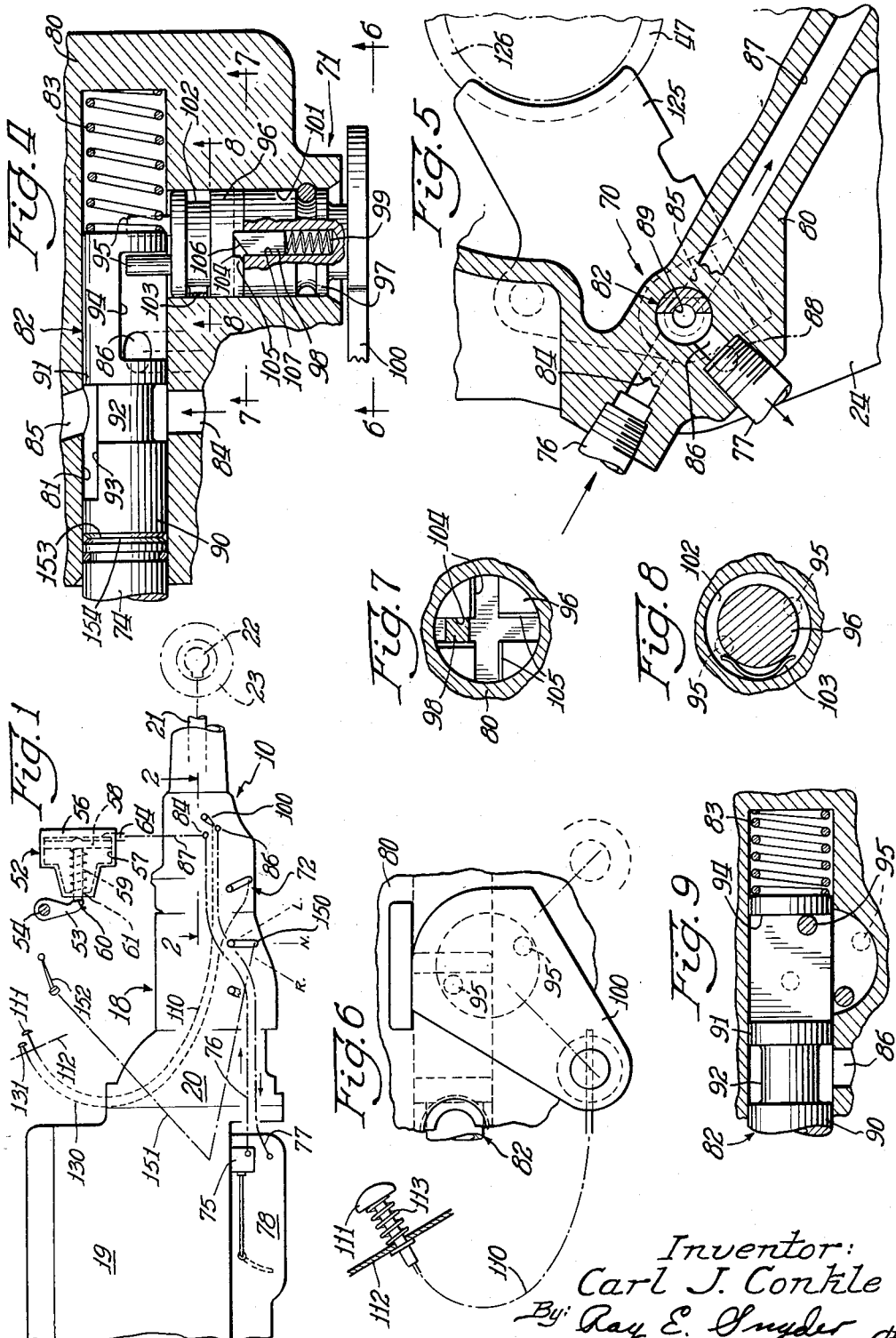

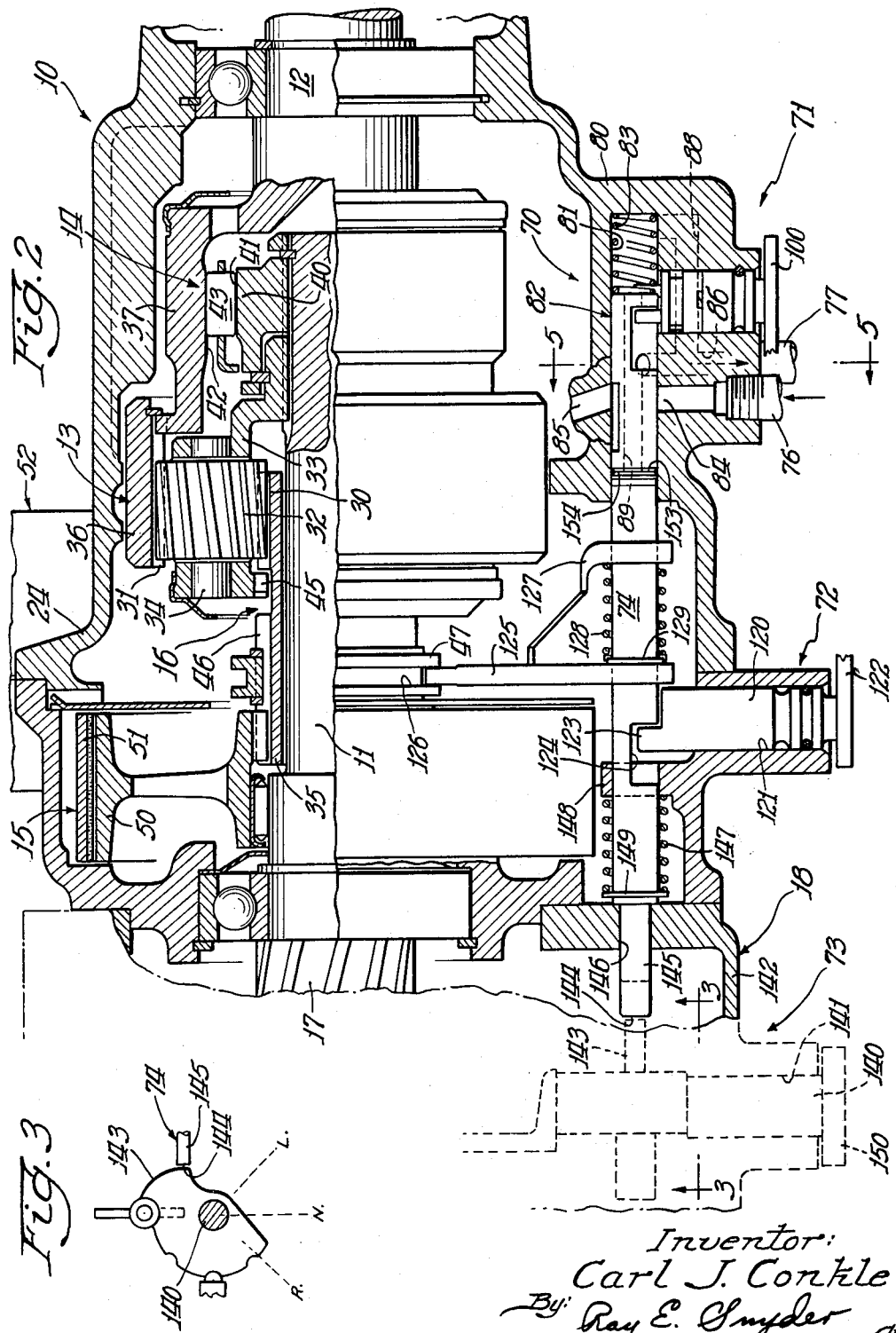

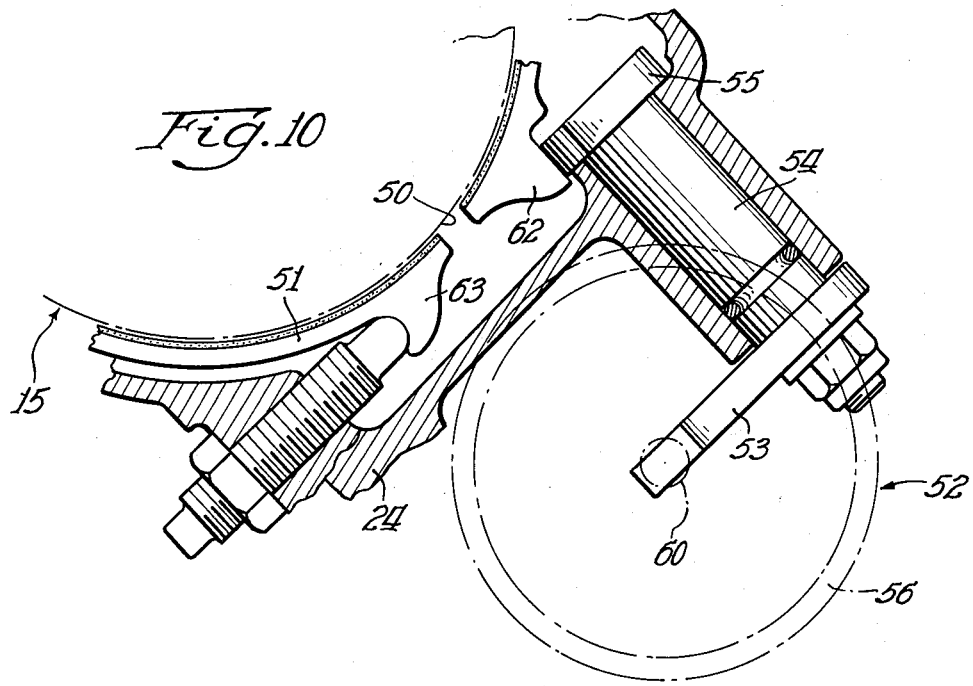
Fig.10
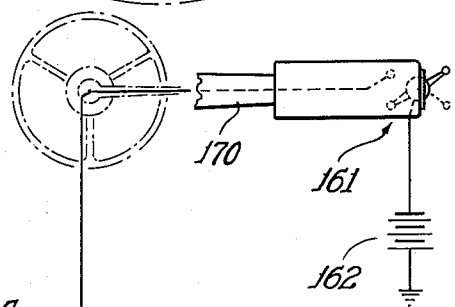
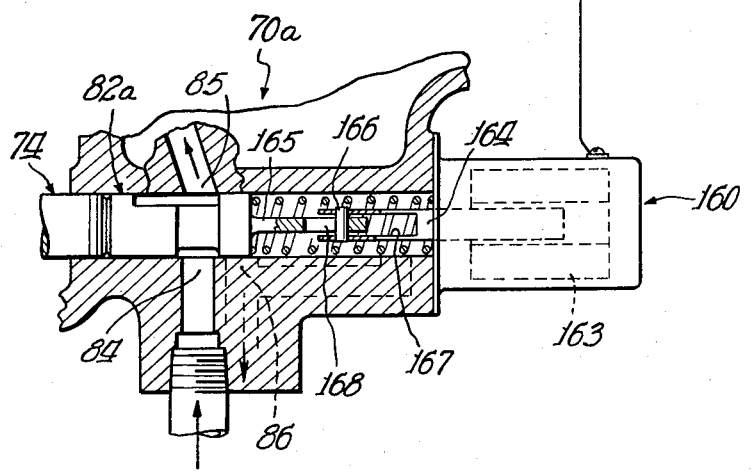
Fig.11

3,126,765
POWER SHIFTED OVERDRIVE
Carl J. Conkle, Muncie, Ind., assignor to Borg-Warner Corporation, Chicago, Ill., a corporation of Illinois
Filed Feb. 2, 1961, Ser. No. 86,635
4 Claims. (Cl. 74—781)

This invention relates to a power-shifted overdrive transmission mechanism adapted to be used in the power train of an automotive vehicle.

It is an object of the present invention to provide an improved overdrive mechanism for an automotive vehicle in which the overdrive ratio is selected at the will of the vehicle operator for any forward driving condition.

It is an additional object to provide an improved overdrive mechanism that is actuated by fluid pressure supplied from the lubricating pump of the vehicle engine.

It is a more particular object to provide an improved overdrive transmission mechanism, the overdrive ratio of which is manually selected by the vehicle operator, fluid pressure for operating the transmission is supplied by the lubricating pump of the engine, and the overdrive ratio is manually selected at the will of the operator by controlling the application of fluid pressure to the overdrive actuating mechanism.

It is still another object to provide a hydraulic pressure operated overdrive mechanism including a fluid servomotor for rendering an overdrive power train effective, a source of fluid pressure for supplying fluid to the servomotor, a longitudinally movable valve for applying fluid pressure to or releasing it from said servomotor, first manually actuatable means for moving said valve, mechanical engaging means for locking up said overdrive transmission mechanism, second manually actuatable means for operating said mechanical lock-up means, and interconnecting means operable by said second manually actuatable means and connected to said valve for rendering said servomotor inoperative when the overdrive mechanism is locked up.

It is a more particular object to provide an overdrive transmission mechanism as described in the preceding object in combination with a multi-speed transmission, means for selecting a plurality of forward drive gear ratios and a reverse drive through said multi-speed transmission, and means interconnecting said selecting means with said valve for rendering said servomotor inoperative when a reverse drive power train is selected through said transmission.

It is another object to provide a hydraulic control mechanism for a transmission comprising a longitudinally movable valve for controlling the transmission, a rotatable member disposed at right angles to the axis of said valve, contact pins carried by said rotatable member and contacting said valve and effective to move it longitudinally upon rotation of said member, an angularly turnable member disposed coaxially with said rotatable member, ratchet means interconnecting said members for advancing said rotatable member, manually actuatable means effective to turn said angularly turnable member a predetermined amount for thereby rotating said rotatable member and longitudinally moving said valve, and resilient friction means for releasably holding said rotatable member while said turnable member is being moved in one direction.

The invention consists of the novel constructions, arrangements, and devices to be hereinafter described and claimed for carrying out the above-stated objects and such other objects as will appear from the following description of a preferred form of the invention, illustrated with reference to the accompanying drawings, wherein:

FIG. 1 is a schematic view of a conventional automotive vehicle installation in which the overdrive transmission of the present invention is utilized, and which also includes an engine, a clutch, and a multi-speed transmission;

FIG. 2 is a longitudinal sectional view through the overdrive transmission and a portion of the multi-speed gearbox;

FIG. 3 is a view taken on line 3—3 of FIG. 2;

FIG. 4 is an enlarged fragmentary sectional view of a control valve for the overdrive transmission;

FIG. 5 is a sectional view taken on line 5—5 of FIG. 2;

FIG. 6 is an external view, partially schematic, taken on line 6—6 of FIG. 4;

FIGS. 7 and 8 are sectional views taken on lines 7—7 and 8—8 of FIG. 4;

FIG. 9 is an enlarged fragmentary view of the control valve of FIG. 4 shown in an alternative position;

FIG. 10 is a sectional view of the brake band actuating mechanism; and

FIG. 11 is a modification of the controls utilizing an electrical solenoid for operating the control valve.

Like characters of reference designate like parts in the several views.

Referring to FIGS. 1 and 2, the improved overdrive mechanism of the present invention is designated generally by the numeral 10 and comprises an input shaft 11, an output shaft 12, a planetary gear set 13, an overrunning clutch 14, a brake 15, and a jaw clutch 16. The input shaft 11, in a conventional installation, is integral with or is connected to be driven by an output shaft 17 of a multi-speed transmission 18. The transmission 18 is connected to be driven by a vehicle engine 19 through a conventional clutch mechanism 20. The output shaft 12 is connected to a propeller shaft 21 for driving a differential mechanism 22 and the driving road wheels 23 of the vehicle. The transmission mechanism 10 is contained within a casing 24.

The planetary gear set 13 comprises a sun gear 30, a ring gear 31, a plurality of planet gears 32, and a planet gear carrier 33. The planet gear carrier 33 is splined to the input shaft 11 and comprises the input member to the planetary gear set 13. The planet gears 32 are in mesh with the ring gear 31 and the sun gear 30 and are rotatably carried on shafts 34 mounted on the planetary gear carrier 33. The sun gear 30 is formed on a sleeve shaft 35 which is journalled and axially slidable on the input shaft 11. The ring gear 31 is formed on the interior of a cylindrical drum 36 and is connected through a second drum 37 to the output shaft 12.

The overrunning clutch 14 comprises a cammed inner race 40 formed with an external cam surface 41, a cylindrical outer race 42 formed on the interior of the drum 37, and a plurality of rollers 43 disposed between the races 40 and 42. The inner race 40 is splined to the input shaft 11 and the outer race 42 is connected to the output shaft 12.

The jaw clutch 16 comprises an internal gear member 45 formed on the planet gear carrier 33, and external splines 46 formed on the sleeve shaft 35, and a shift collar 47 fixedly mounted on the sleeve shaft 35. The shift collar 47 is adapted to move the sleeve shaft 35 axially so that the splines 46 engage the gear member 45 and thereby lock the sun gear 30 to the planet gear carrier 33 for locking up the gear set 13.

The brake 15 comprises a brake drum 50 and a brake band 51 surrounding the drum 50. The brake 15 functions to hold the sun gear 30 stationary so that it serves as a reaction member for the planetary gear set 13.

The mechanism for operating the brake 15 is shown on FIGS. 10 and 1 comprises a fluid pressure actuated servomotor 52, a lever 53, a rotatable shaft 54, and a cam 55. The servomotor 52 comprises a casing portion 56 formed with an internal cylindrical cavity 57, a piston 58 slidably disposed in the cavity 57, and a spring 59. The piston 58 carries a connecting shaft 60 which extends through an opening 61 formed in the casing 56. The connecting shaft 60 is adapted to contact one end of the lever arm 53 for turning shaft 54. The shaft 54 is rotatably mounted within the casing 56 and has the lever arm 53 attached to one end and the cam 55 attached to the other end. The cam 55 contacts a flange 62 attached to one end of the brake band 51 and is adapted to wrap the brake band 51 into engagement with the drum 50. The brake band 51 also has a flange 63 which is anchored to the transmission casing 24. The casing 56 is formed with a port 64 opening into the cavity 57 and through which fluid under pressure is supplied for actuating the piston 58.

The controls for the transmission 10 comprise a control valve 70 and its actuating mechanism 71, a manual lock-up mechanism 72, a reverse lock-up mechanism 73, and a shift rail 74. Fluid pressure for actuating the brake servo 52 is supplied from the engine lubricating pump 75 through a fluid conduit 76. A fluid return conduit 77 returns fluid from the servo 52 to the engine sump or crankcase 78.

The control valve 70 comprises a casing portion 80 formed with a longitudinal cylindrical bore 81, a valve piston 82 slidably disposed within the bore 81, and a spring 83. The casing 80 is formed with ports 84, 85, and 86, all opening into the bore 81. The port 84 is connected to the fluid supply conduit 76, the port 86 is connected to the fluid return conduit 77, and the port 85 is connected to a conduit or channel 87 which is connected to the port 64 of the servomotor 52. The casing 80 is also formed with a port 88 and channel 89 for returning fluid that leaks past piston 82 to the return conduit 77.

Referring to FIG. 4, the valve piston 82 is formed with lands 90 and 91, an annular groove 92 between the lands, and longitudinal slots 93 and 94. The slot 93 is in communication with the annular groove 92 and at all times is in communication with the port 85. The valve piston 82 is adapted to be moved longitudinally by the actuating mechanism 71 so that the groove 92 registers either with the supply port 84 or with the return port 86. The slot 94 receives pins 95 of the actuating mechanism 71 for moving the valve piston 82 longitudinally against the action of the valve spring 83.

A preferred embodiment of an actuating mechanism 71 for the valve 70 comprises a ratchet spool 96, a rotatable shaft 97 carrying a ratchet detent 98 and spring 99, and an actuating lever 100. The spool 96 and shaft 97 are rotatably disposed within a cylindrical bore 101 formed within the casing 80 at right angles to and offset slightly from the bore 81. The spool 96 carries two pins 95 which extend into the bore 81 and contact the valve piston 82. The spool 96 is formed with an annular groove 102 for receiving a spring clip 103 (as shown in FIG. 8). The spool 96 is also formed with radial grooves 104 on one end adjacent the shaft 97 for receiving the ratchet detent 98. Each of the grooves 104 are tapered on one edge 105 for coacting with a slanted face 106 formed on the ratchet detent 98 (see FIG. 7).

The shaft 97 is formed with a longitudinal rectangular bore 107 for receiving the ratchet detent 98 and a spring 99. The external lever 100 is fixedly attached to one end of the shaft 97 and is connected by means of a cable or linkage 110 to an actuating button 111 mounted on the vehicle dashboard 112 or other suitable place accessible to the vehicle operator. A spring 113 is disposed between the button 111 and dashboard 112 for preloading the cable 110. It should be understood that the spring 113 could also be connected elsewhere to the cable 110 and still perform the same function.

The manual lock-up mechanism 72 comprises a rotatable shaft 120 mounted in and extending through a bore 121 formed through the transmission casing 24, and an external lever 122 attached to the outer end of the shaft 120. The shaft 120 is formed on its inner end with an eccentric crank portion 123 adapted to be received in a longitudinal slot 124 formed in the shift rail 74. The shift rail 74 carries a shift fork 125 which engages the shift collar 47 mounted on the sleeve shaft 35. The shift collar 47 is formed with an annular groove 126 for receiving the shift fork 125. A supporting bracket 127 is mounted within the transmission casing 24 and a spring 128 surrounds the rail 74 and is disposed under compression between the bracket 127 and a spring retaining ring 129 mounted on the shift rail 74. The spring 128 tends to force the shift rail 74 and shift fork 125 to the left (as shown in FIG. 2) for disengaging the jaw clutch 16 when the force exerted by the lock-up control mechanism 72 is removed. The lever 122 for operating the lock-up mechanism 72 may be actuated by a cable or linkage 130 connected to a knob 131 mounted on the vehicle dashboard 112 or other accessible place.

The reverse lock-up mechanism 73 comprises a portion of the gear ratio selector mechanism of the transmission 18. The transmission 18 may be assumed to be a conventional manually shifted, countershaft transmission that is well known in the art and will not be further described. The mechanism 73 includes a rotatable shaft 140 disposed in a bore 141 formed through the casing 142 of the transmission 18. The shaft 140 carries an angularly rotatable cam 143 which contacts an end 144 of the shift rail 74. For this purpose, the shift rail 74 is formed with a longitudinal extension 145 of reduced diameter which extends through an opening 146 formed in the transmission casing 142.

Referring to FIG. 3, the cam 143 can be selectively turned into one of three positions corresponding to low speed forward drive, neutral, and reverse drive. When the transmission 18 is shifted into reverse drive condition, the cam 143 forces the shift rail 74 to the right, as shown moving the shift fork 125 and collar 47 for engaging the jaw clutch 16. A spring 147 also surrounds the shift rail 74 and is disposed under compresison between a flange 148 formed within the transmission casing 24 and a retaining ring 149 attached to the shift rail 74. The spring 147 tends to force the shift rail 74 to the left, as shown, for disengaging the clutch 16 when the force due to the cam 143 is removed.

The shaft 140 carries an external lever 150 which is connected by any suitable linkage 151 to a manual gear selector lever 152.

The shift rail 74 is mounted within the transmission casing 24 coaxial with the valve piston 82. An end 153 of the shift rail 74 extends into the bore 81 and abuts against an end 154 of the valve piston 82. The shift rail 74 moves the valve piston 82 to the right against the action of the spring 83 whenever the manual lock-up mechanism 72 or the reverse lock-up mechanism 73 are actuated for locking up the jaw clutch 16. Movement of the valve piston 82 to the right insures that fluid pressure will not be applied to the servomotor 52 whenever the jaw clutch 16 is so engaged.

*Operation*

Whenever the vehicle engine is running, fluid under pressure is supplied by the engine lubricating pump 75 through the conduit 76 to the control valve 70. The fluid pressure is blocked at the port 84 by the land 90 of the valve piston 92 whenever the actuating mechanism 71 is conditioned for direct drive, or when the mechanisms 72 or 73 are in a lock-up position. When either of the lock-up mechanisms 72 or 73 are engaged and when fluid pressure to the servomotor 52 is cut off by the control valve 70, the brake 15 is disengaged and the sun gear 30 floats freely so that there is no reaction member for the gear set 13. The input shaft 11 rotating in the forward direction causes the one-way clutch 14 to engage and the output shaft 12 is driven at a 1:1 or direct drive ratio with respect to the input shaft 11.

Assuming that the mechanisms 72 and 73 are unlocked, the overdrive gear ratio is selected by depressing the button 111. Depression of the button 111 moves the cable 110 and lever arm 100 for turning the rotatable shaft 97 through approximately 90°, the ratchet detent 98 is moved axially against the action of the spring 99 while the shaft 97 is being turned until the detent comes into engagement with the next groove 104. The spring clip 103 functions to hold the ratchet spool 96 stationary during this operation. When the button 111 is released, the spring 113 exerts a force on the cable 110 and rotates the lever arm back to its original position. The ratchet detent 98 advances the spool 96 through approximately 90° and one of the pins 95 rotates clockwise (as shown in FIG. 9) out of contact with the valve piston 82. The spring 83 forces the valve piston 82 to the left until the valve piston 82 contacts the other pin 95 and the groove 92 is placed in register with port 84.

Fluid under pressure passes through the ports 84 and 85 and through conduit 87 into the servomotor 52 for engaging the brake 15. The engaged brake 15 holds the sun gear 30 stationary so that it functions as a reaction element for the planetary gear set 13. The input shaft 11 drives the planet gear carrier 33 in the forward direction and the planet gears 32 walk around the stationary sun gear 30 and drive the ring gear 31 at an overdrive ratio. The one-way clutch 14 overruns for this condition and the output shaft 12 is driven at an overdrive ratio with respect to the input shaft 11.

Whenever the transmission 18 is conditioned for reverse drive, the planetary gear set 13 is locked up by the jaw clutch 16 so that there is a 1:1 drive ratio between the input shaft 11 and the output shaft 12. Conditioning the transmission 18 for reverse drive causes the cam 143 to turn angularly and act against the shift rail 74. The shift rail 74 moves the shift fork 125 and shift collar 47 longitudinally for engaging the jaw clutch 16 and thereby locking up the planetary gear set 13. Movement of the shift rail 74 also moves the control valve piston 82 longitudinally so that fluid pressure from the conduit 76 is cut off by the land 90 and the servomotor 52 is permitted to drain through conduit 87, port 86 and conduit 77 to the engine sump 78. When the transmission 18 has been conditioned for reverse drive, the input shaft 11 is caused to rotate in the reverse direction and drives the planetary gear set 13 and the output shaft 12 in the same direction at a 1:1 ratio.

The transmission 10 can be locked up at the option of the driver by manipulating the button 131. This is effective to turn the actuating lever 122 and shaft 120 of the lock-up mechanism 72. The eccentric portion 123 of shaft 120 engaged in the slot 124 is effective to move the shift rail 74 and fork 125 to the right for locking up the jaw clutch 16 and thereby locking up the gear set 13. Movement of the shift rail 74 is effective to move the control valve piston 82 into its disapply position so that no pressure is applied to the servomotor 52 for engaging the brake 15.

An alternative method of operating the control valve 70a is shown in FIG. 11. The control system for this embodiment comprises an electrical pull-type solenoid 160, and a switch 161 connected in series to the vehicle battery 162. The solenoid 160 comprises a coil 163 and an armature 164. The control valve piston 82a is formed with a longitudinal extension 165 which is connected to the armature 164 by means of a pin 166. The armature 164 is formed with a longitudinal slot 167 for receiving the extension 165, and the extension 165 is formed with an elongated slot 168 through which the pin 166 extends. The slot 168 provides a lost-motion connection with the pin 166 for permitting longitudinal movement of the valve piston 82a when the solenoid 160 is de-energized. The shift rail 74 abuts against the end of the valve piston 82a for moving it to the disapply position whenever manual lock-up or reverse lock-up conditions are established.

The switch 161 for actuating the solenoid 160 is shown as mounted on the end of the vehicle gear shift lever 170, but it is to be understood that this switch may be located at any place convenient to the vehicle operator.

While this invention is described in connection with certain specific constructions and arrangements, it is to be understood that this is by way of illustration and not by way of limitation and the scope of this invention is defined solely by the appended claims which should be construed as broadly as the prior art will permit.

What is claimed is:

1. In a control system for an overdrive transmission having an input shaft and an output shaft, and a planetary gear set and an overrunning clutch interconnecting said shafts, the combination of brake means including a fluid pressure servomotor for rendering an overdrive power train effective between said shafts, a source of fluid pressure connected to actuate said servomotor, a movable valve effective in one position to apply fluid pressure from one source to said servomotor and effective in a second position to release fluid pressure from said servomotor, manual means effective to move said valve to either position, mechanical lock-up means effective to lock up said gear set for completing a direct drive power train between said shafts, actuating means for operating said lock-up means and interconnected with said valve, said actuating means constituting an additional means to move said valve thereby releasing fluid pressure from said servomotor when said lock-up means is engaged.

2. In a control system for an overdrive transmission mechanism having an input shaft and an output shaft and a planetary gear set and an overrunning clutch interconnecting said shafts and adapted to be used in the power train of an automotive vehicle in combination with a multi-speed gear set capable of providing a forward drive gear ratio and a reverse drive gear ratio, the combination of brake means including a fluid actuated servomotor for rendering an overdrive power train effective between said shafts, a source of fluid pressure connected to supply fluid to said servomotor, a movable valve interconnected with said source and said servomotor and effective in one position to supply fluid pressure to said servomotor and effective in a second position to release fluid pressure from said servomotor, mechanical lock-up means for locking up said planetary gear set for completing a direct drive power train between said shafts, gear selecting means connected to said multi-speed gear set and effective in one position to render effective a reverse drive power train therethrough, and actuating means connecting said selecting means with said mechanical lock-up means and with said valve and effective to lock up said planetary gear set and to move said valve for releasing fluid pressure from said servomotor when a reverse drive condition has been established by said selecting means.

3. In a control system for an overdrive transmission adapted to be used in combination with a multispeed gear set, the combination of a fluid pressure actuated servomotor operable to render an overdrive power train effective through the transmission, mechanical lock-up means effective to complete a direct drive power train through the transmission, a source of fluid pressure, a movable valve interconnected with said source and said servomotor and effective in one position to connect said source with said servomotor and effective in a second position to cut off fluid pressure from said source and release fluid from said servomotor, first manually operated means for moving said valve to one or the other position, second manually operated means for actuating said lock-up means, third manually operated means for operating said multispeed gear set and effective in one position to establish a reverse drive power train through the multispeed gear-set, and a shift rail interconnecting said second and third operated means with said mechanical lock-up means and with said valve and effective to move said valve into its second position whenever said shift rail has been moved by said second or third manually operated means for engaging said lock-up means.

4. In a control system for an overdrive transmission, the combination of a fluid pressure actuated servomotor for rendering an overdrive ratio effective through the transmission, a source of fluid pressure for supplying fluid to said servomotor, a longitudinally movable valve effective in one position to connect said source with said servomotor and effective in a second position to release fluid from said servomotor, mechanical lock-up means for completing a direct drive power train through the transmission, manually operated means for actuating said lock-up means, means interconnecting said manually operated means with said valve for moving it to its second position when said lock-up means is engaged, and control means for also moving said valve including a solenoid having a movable armature and electrical means for energizing said solenoid, resilient means for biasing said valve toward one position, and interconnecting means defining a lost-motion connection between said valve and said armature for permitting movement of said valve by said manually operated means independently of said solenoid armature.

References Cited in the file of this patent
UNITED STATES PATENTS

| | | |
|---|---|---|
| 1,511,953 | Dwyer | Oct. 14, 1924 |
| 1,964,045 | Fausek | June 26, 1934 |
| 2,159,426 | Dunn | May 23, 1939 |
| 2,399,097 | Carnagua | Apr. 23, 1946 |
| 2,548,761 | Armantrout | Apr. 10, 1951 |
| 2,658,412 | Kelbel | Nov. 10, 1953 |
| 2,699,073 | Flinn | Jan. 11, 1955 |
| 2,720,120 | Orr et al. | Oct. 11, 1955 |